(No Model.)
W. J. O'NEILL.
ASH SIFTER.
No. 559,596.  Patented May 5, 1896.
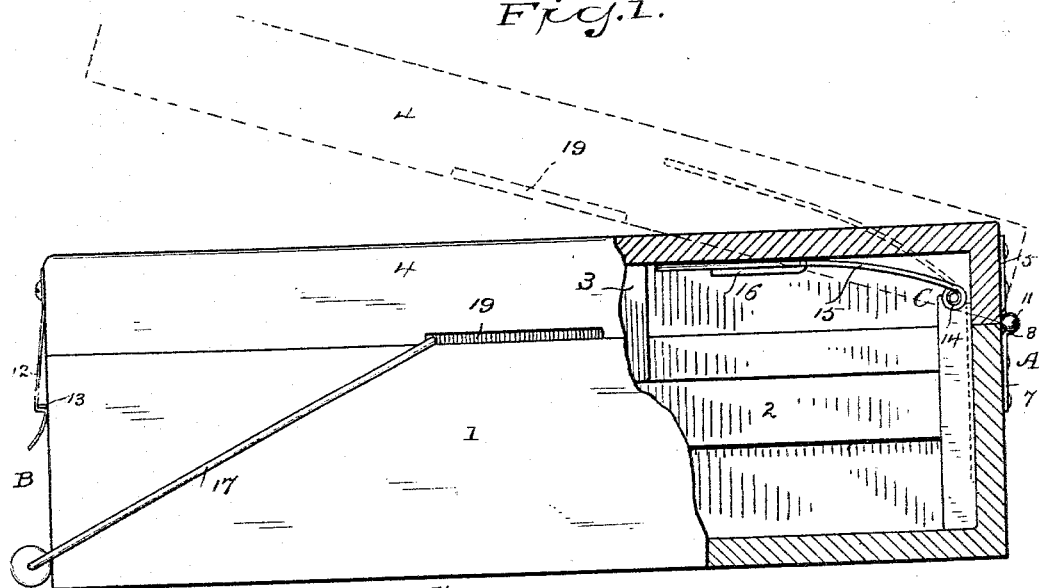
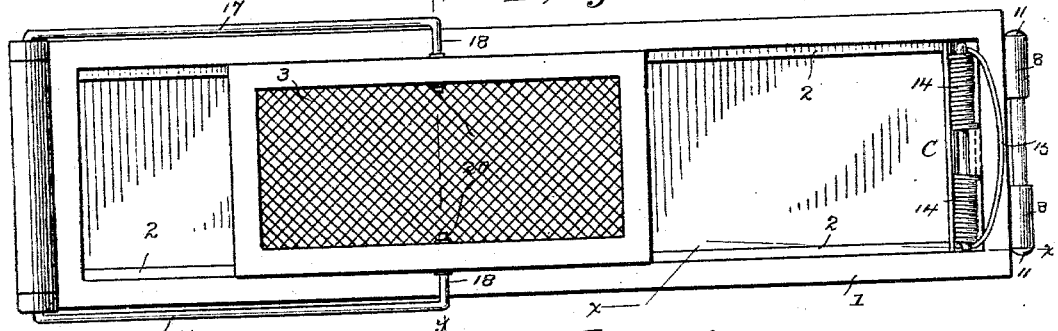
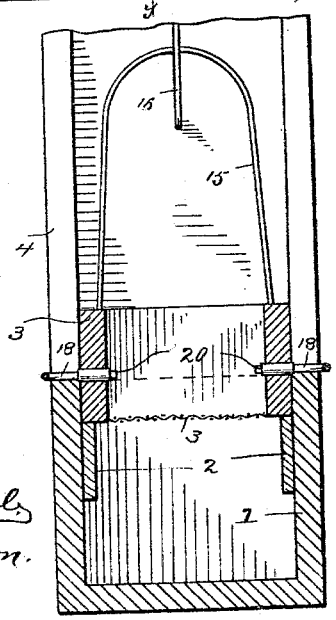
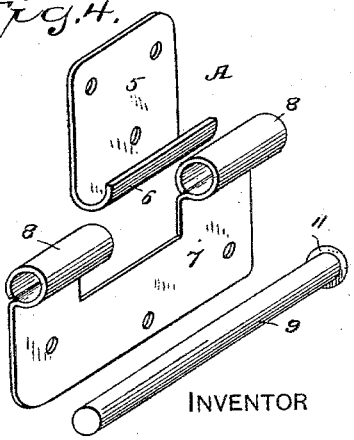
WITNESSES
H. H. Lamb
N. Richardson
INVENTOR
William J. O'Neill
By A. M. Wooster
Atty

UNITED STATES PATENT OFFICE.

WILLIAM J. O'NEILL, OF STAMFORD, CONNECTICUT.

ASH-SIFTER.

SPECIFICATION forming part of Letters Patent No. 559,596, dated May 5, 1896.

Application filed December 10, 1895. Serial No. 571,624. (No model.)

*To all whom it may concern:*

Be it known that I, WILLIAM J. O'NEILL, a citizen of the United States, residing at Stamford, in the county of Fairfield and State of Connecticut, have invented certain new and useful Improvements in Ash-Sifters; and I do hereby declare the following to be a full, clear, and exact description of the invention, such as will enable others skilled in the art to which it appertains to make and use the same.

My invention has for its object to produce an ash-sifter which shall be simple and inexpensive, convenient, and agreeable to operate, and practically dust-proof, so that the sifting operation may be performed in a room without the usual unpleasant results. With these ends in view I have devised the novel ash-sifter of which the following description, in connection with the accompanying drawings, is a specification, numbers and letters being used to designate the several parts.

Figure 1 is a view of my novel ash-sifter, partly in elevation and partly in vertical section, on the line $x\ x$ in Fig. 2, the lid being shown in full lines in the closed position and in dotted lines as in the act of being raised by the spring; Fig. 2, a plan view with the cover removed; Fig. 3, a section on the line $y\ y$ in Fig. 2, the cover, however, being connected to the box and held at the raised position by the spring; and Fig. 4 is a perspective illustrating the parts of the separable hinge.

1 denotes the box, which may be made of any preferred shape and size, but is preferably made relatively long and narrow, as indicated in the drawings. On the inner side of the box are cleats 2, on which a sieve 3 slides.

4 denotes the lid, which is attached to the box by a separable hinge, which I have indicated by A. Any form of separable hinge may of course be used, although I preferably use a hinge of substantially the form illustrated in Fig. 4.

5 denotes the part of the hinge which is attached to the lid and which is provided with a hooked-shaped portion, (indicated by 6,) and 7 denotes the part of the hinge which is attached to the box and which is provided with eyes 8. A rod 9 is passed through the eyes and headed down at both ends, as at 11.

The lid is held at the closed position by means of a suitable catch B. Any form of catch may be used, although I preferably use a catch of substantially the style shown in the drawings, which consists of a part 12 on the lid and a part 13 on the box. When the lid is released, it is thrown to the raised position and held there by a spring C. Any form of spring may be used, although I preferably use substantially the form of spring illustrated in the drawings, which consists of coils 14, attached to the box, and a loop 15, formed from the same piece of wire which bears upon the lid. Upon the under side of the lid is a guide 16, which is engaged by the loop and which prevents the lid from being thrown over by the spring when the catch is released. It should be understood that this spring throws the cover entirely out of the way, so that the sieve may be placed in position or removed, but does not detach the lid from the box. Should it be desired to detach the lid from the box, the lid is moved forward far enough to permit the loop to be disengaged from the guide, the guide being open at one end, as shown in Fig. 1. This permits the lid to be turned over backward past the vertical position. When in this position the lid may be detached from the box by simply lifting it up, as hook 6 will not then be in engagement with rod 9. This ready removal of the lid is due to the fact that the hook 6 projects under the rod 9 and in a direction away from the back of the lid. Since the hook 6 is substantially semicircular in form, it can readily be lifted away from the rod 9 when the lid is turned way back after disengaging the spring-loop 15 from the guide 16. The lid may be again attached by placing it in the same position with the hook between the eyes. The lid is then moved forward toward the closed position and the loop placed in engagement with the guide.

17 denotes a bail, which is made long enough to drop entirely over either end of the box. The ends of the bail, which I have indicated by 18, are turned inward, passed through recesses 19 in the side edges of the lid, and are pivotally secured to the sieve, as at 20.

It will be noticed in Figs. 1 and 3 that the recesses through which the ends of the bail pass are approximately the mid-height of the sides of the sieve, the cover shutting down over the upper half of the sieve. As the sieve fits the box and the cover fits the top of the sieve as closely as is practicable and leave freedom of movement to the sieve, it will be seen that any escape of dust from the inside of the box is practically impossible.

In practice the box is made large enough to contain the ashes produced in a number of days. The ashes removed from a stove or furnace are placed in the sieve, the lid fastened, and the sieve reciprocated by means of the bail. After the dust has settled the sieve may be removed to dump the partly-burned coal, it being noted, of course, that the bail is long enough to drop over either end of the box, so as to permit the cover to be raised without interference with the bail and leaving the sieve wholly independent of the box, so that the sieve, bail and all, may be removed without disconnecting any parts.

Having thus described my invention, I claim—

1. The combination with the box and the lid having recesses 19 in its edges, of a sieve adapted to be reciprocated within the box and a bail adapted to drop past the end of box, the inner ends of said bail being turned inward, passed through the recesses and pivotally connected to the sides of the sieve, the sieve fitting closely within the box and the lid fitting closely over the sieve so that escape of dust is prevented.

2. The combination with the box and the lid having a guide 16 on its under side, said guide being open at one end of a sieve adapted to be reciprocated within the box, a spring having a loop 15 which acts to throw the cover to the raised position and is adapted to engage the guide to prevent the cover from being thrown over backward, and a separable hinge connecting the box and lid.

3. The combination with the box having at one end a part 7 having eyes 8 and a rod 9 passing through the eyes, of a lid having a part 5 provided with a semicircular hook 6 projecting away from the back of the lid and engaging the under side of the rod between the eyes whereby the lid is detachably connected to the box and a sieve adapted to be reciprocated within the box.

4. The combination with the box and the lid detachably hinged thereto and having recesses 19 in its edges, of a sieve adapted to reciprocate within the box and a bail adapted to drop outside of and past the end of the box, the inner ends of said bail being turned inward, passed through the recesses and pivotally connected to the sides of the sieve.

5. The combination with the box and the lid having a guide 16 on its under side and open at one end, of a sieve adapted to be reciprocated within the box, and a spring having a loop 15 which acts to throw the cover to the raised position and is adapted to engage the guide to prevent the cover from being thrown over backward, a catch B to retain the lid in the closed position against the power of the spring, and a separable hinge connecting the box and lid.

In testimony whereof I affix my signature in presence of two witnesses.

WILLIAM J. O'NEILL.

Witnesses:
EDWARD P. HAYES,
ELBREY M. PURDY.